United States Patent
Oshitani

(10) Patent No.: US 7,973,808 B2
(45) Date of Patent: Jul. 5, 2011

(54) MAP DISPLAY APPARATUS WITH SCROLLING TEXT

(75) Inventor: Yasuyuki Oshitani, Kariya (JP)

(73) Assignee: Denso Corporation, Kariya (JP)

( * ) Notice: Subject to any disclaimer, the term of this patent is extended or adjusted under 35 U.S.C. 154(b) by 750 days.

(21) Appl. No.: 11/987,801

(22) Filed: Dec. 4, 2007

(65) Prior Publication Data

US 2008/0136841 A1    Jun. 12, 2008

(30) Foreign Application Priority Data

Dec. 4, 2006    (JP) .................................. 2006-327375

(51) Int. Cl.
*G09G 5/00*    (2006.01)

(52) U.S. Cl. .......... 345/684; 345/124; 701/23; 701/200; 715/784; 715/785; 715/830

(58) Field of Classification Search .................. 345/684, 345/124; 701/200, 23; 715/256, 784, 785, 715/830

See application file for complete search history.

(56) References Cited

U.S. PATENT DOCUMENTS

| | | | | |
|---|---|---|---|---|
| 4,160,981 A | * | 7/1979 | Raney, Jr. ....................... | 345/13 |
| 4,915,633 A | * | 4/1990 | Auer et al. ..................... | 434/159 |
| 5,745,866 A | * | 4/1998 | Steiner ........................... | 701/200 |
| 5,749,082 A | * | 5/1998 | Sasaki ............................ | 715/210 |
| 6,144,318 A | | 11/2000 | Hayashi et al. | |
| 6,147,670 A | * | 11/2000 | Rossmann ..................... | 345/685 |
| 6,304,820 B1 | * | 10/2001 | Goto et al. ..................... | 701/209 |
| 6,415,224 B1 | * | 7/2002 | Wako et al. .................... | 701/208 |
| 6,477,464 B2 | * | 11/2002 | McCarthy et al. ............ | 701/213 |
| 6,565,610 B1 | * | 5/2003 | Wang et al. ................... | 715/210 |
| 2006/0242595 A1 | * | 10/2006 | Kizumi .......................... | 715/786 |

FOREIGN PATENT DOCUMENTS

| | | |
|---|---|---|
| JP | A-09-101747 | 4/1997 |
| JP | A-2003-097954 | 4/2003 |

* cited by examiner

*Primary Examiner* — Michelle K Lay

(74) *Attorney, Agent, or Firm* — Posz Law Group, PLC

(57) ABSTRACT

A map display apparatus includes a display unit, a data access unit accessible to map data, which includes a map image and character strings, and a control unit that allows the display unit to display the map data on a screen in such a manner that each character string is overlaid on a corresponding position on the map image. The control unit interprets the character string having characters, the number of which exceeding a predetermined maximum number of characters, as a scroll character string. The control unit creates a scroll display field in the corresponding position to the scroll character string and causes the scroll character string to scroll within the scroll display field.

16 Claims, 6 Drawing Sheets

| H | I | G | H | W | A | Y |   | 9 | 9 | 9 |
|---|---|---|---|---|---|---|---|---|---|---|
| R | O | U | T | E |   | 0 | 0 | 0 |   |   |
| X |   | C | I | T | Y |   |   |   |   |   |
| C | I | T | Y |   | H | A | L | L |   |   |

MAP DISPLAY APPARATUS WITH SCROLLING TEXT

CROSS REFERENCE TO RELATED APPLICATION

This application is based on and incorporates herein by reference Japanese Patent Application No. 2006-327375 filed on Dec. 4, 2006.

FIELD OF THE INVENTION

The present invention relates to a map display apparatus that displays a map where a character string is overlaid on a map image.

BACKGROUND OF THE INVENTION

An apparatus has been proposed that displays a map where a road name as a character string is overlaid on a map image. For example, in an apparatus disclosed in JP-H9-101747, a name display frame for displaying a road name is preset within a map display frame for displaying a road map. When there is an intersection between the name display frame and a road displayed on the map display frame, a corresponding road name is displayed on the intersection.

In such a conventional apparatus, as the number of characters in a character string overlaid on a map image is larger, visibilities of the map image and the character string become worse.

SUMMARY OF THE INVENTION

In view of the above-described problem, it is an object of the present invention to provide a display apparatus, in which visibilities of both a map image and a character string overlaid on the map image can be ensured.

A display apparatus includes a display unit, a data access unit accessible to map data including a map image and a plurality of character strings, and a control unit for allowing the display unit to display the map data on a screen in such a manner that each character string is overlaid on a corresponding position on the map image. The control unit interprets a character string having characters, the number of which exceeding a predetermined maximum number of characters, as a scroll character string. The control means creates a scroll display field in the corresponding position to the scroll character string and causes the scroll character string to scroll within the scroll display field.

The number of characters in the character string displayed at a time is limited to the maximum number of characters to ensure visibility of the map image. Further, the scroll character string is scroll-displayed within the scroll display field to ensure visibility of the scroll character string. Thus, visibilities of both the map image and the character string overlaid on the map image can be ensured.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

Figures 1, 4:
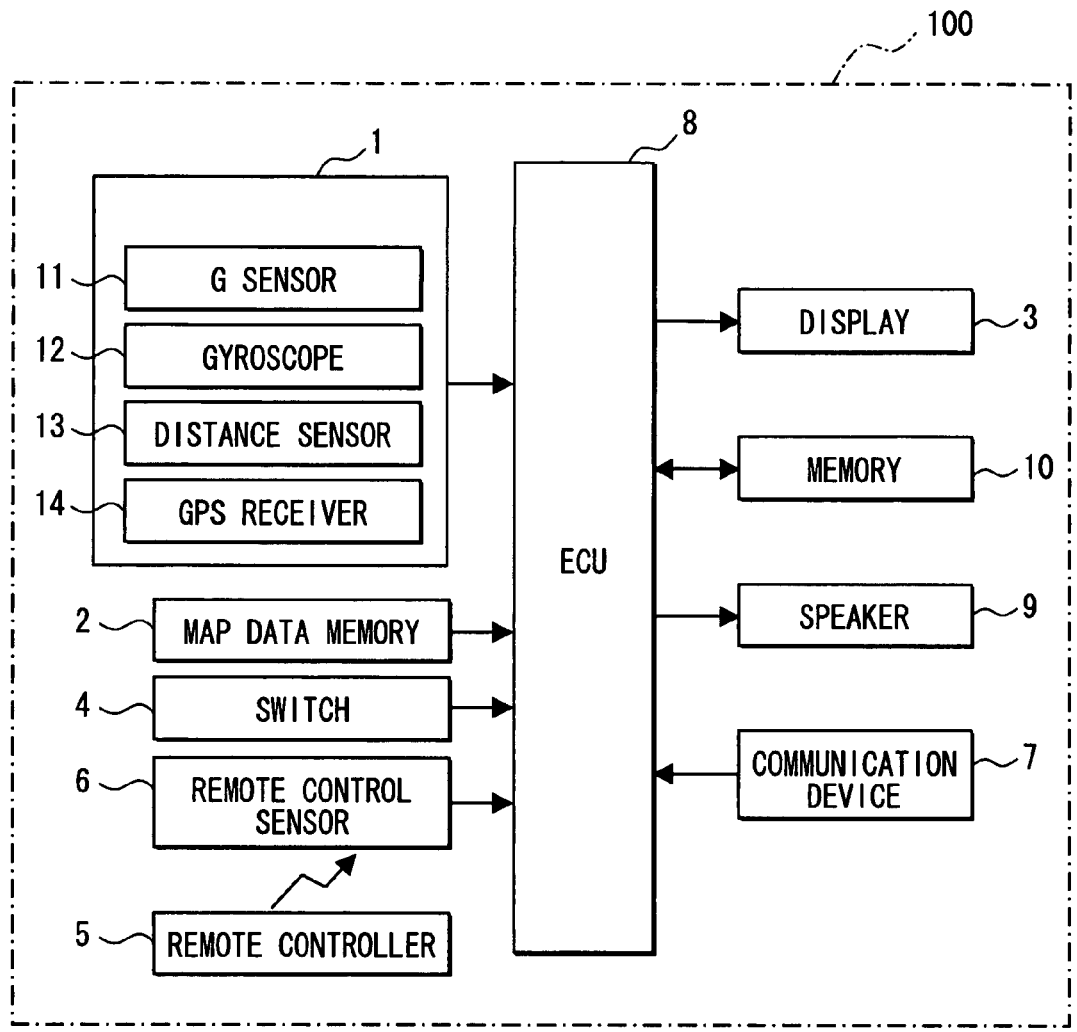
FIG. 1 is a block diagram illustrating a map display apparatus according to an embodiment of the present invention.
FIG. 4 is a diagram illustrating text data of two roads, a region, and a facility extracted from a map image displayed on the map display apparatus according to the embodiment.

Referring to FIG. 1, a vehicle navigation apparatus 100 having a map display apparatus according to an embodiment of the present invention includes a location sensor 1, a map data storage unit 2, a display unit 3, a control switch 4, a remote controller 5, a remote control sensor 6, a communication device 7, an electronic control unit (ECU) 8, a speaker 9, and a memory 10.

As shown in FIG. 1, the location sensor 1 includes a geomagnetic (G) sensor 11, a gyroscope 12, a distance sensor 13, and a global positioning system (GPS) receiver 14. The location sensor 1 detects a current location of a vehicle and a heading direction of the vehicle.

The G sensor 11 is a direction sensor. The G sensor 11 includes a ring-shaped ferromagnet (not shown), an exciting winding (not shown) wound around the ferromagnet to excite the ferromagnet, and two detection windings (not shown) wound around the ferromagnet and arranged perpendicular to each other to detect a direction. When an alternating current (AC) voltage is applied to the exciting winding, voltages appear on the detection windings. Based on the voltages, the heading direction of the vehicle is detected as an absolute direction.

The gyroscope 12 is also a direction sensor. In the gyroscope 12, the heading direction of the vehicle is detected as a relative direction. For example, the gyroscope 12 includes a crystal oscillator (not shown). The gyroscope 12 detects a yaw rate of the vehicle based on vibrations caused by Coriolis force produced when the crystal oscillator vibrates.

The distance sensor 13 detects a traveled distance of the vehicle based on, for example, a rotational signal of an axle (not shown) or a wheel (not shown) of the vehicle. The GPS receiver 14 receives a GPS signal from GPS satellites and detects a latitude, a longitude, and an altitude of the current location of the vehicle based on location information contained in the GPS signal.

The detection results of the G sensor 11, the gyroscope 12, the distance sensor 13, and the GPS receiver 14 compensates each other so that the location sensor 1 can accurately detect the current location and the heading direction of the vehicle. Some of the G sensor 11, the gyroscope 12, the distance sensor 13, and the GPS receiver 14 can be removed from the location sensor 1, if high detection accuracy is not required. Alternatively, the current location and heading direction of the vehicle can be detected based on vertical and lateral acceleration measured with a three-dimensional gyroscope, for example. Alternatively, the current location and heading direction of the vehicle can be detected based on detection signals from other sensors such as a steering wheel sensor.

The map data storage unit 2 has a storage medium such as a hard disk. The map data storage unit 2 stores navigation data including map information data, map image data, and text data (i.e., character strings). The map information data includes object information such as road information, facility information, region information (e.g., address and postal code), and the like. The map image data includes map images. The text data includes object names such as road names, region names, facility names, and the like. Alternatively, the navigation data can be stored in a storage media such as a CD-ROM, DVD-ROM, a flash memory card (e.g., a secure digital (SD) or a compact flash) or the like, and the map data storage unit 2 can access the navigation data stored in the storage media.

The display unit 3 is small in size and designed for on-board applications. The display unit 3 displays navigation displays based on the navigation data. Alternatively, the navigation displays can be displayed on other display units such as head-up display units.

The control switch 4 includes a plurality of mechanical switches, for example. The control switch 4 can include a touch switch displayed on display units such as the display unit 3. Navigation operations are controlled through the control switch 4.

The remote controller 5 has a plurality of switches and can act as a multifunctional remote controller. The remote controller 5 can also control the navigation operations through the remote control sensor 6.

The communication device 7 is small in size and designed for on-board applications. For example, the communication device 7 can receive road traffic information from an external service center (not shown) such as a vehicle information and communication system (VICS) center in Japan. The road traffic information can include traffic flow information, traffic regulation information, and the like. Alternatively, the road traffic information can be received via a public network such as the interne.

The ECU 8 performs the navigation operations in accordance with commands received from the control switch 4 or the remote controller 5. Specifically, based on the vehicle current location and heading direction detected by the location sensor 1, the ECU 8 reads map image data of an area around the current location from the data storage unit 2. At the same time, the ECU 8 receives road traffic information through the communication device 7. The ECU 8 controls the display unit 3 so that a map image corresponding to the map image data is displayed on a screen of the display unit 3. The map image turns around automatically so that the heading direction always points toward the upper side of a screen of the display unit 3. A current location mark indicating the current location of the vehicle is overlaid on the map image. A character string indicating the road traffic information is also overplayed on the map image. Further, a voice navigation is performed through the speaker 9.

Object names of roads, regions, and facilities contained in the map image displayed on the display unit 3 are overlaid on the map image. If the name to be overlaid is long (i.e., the number of characters of the name is large), the name is displayed in a scrolled manner as follows:

Firstly, the ECU 8 extracts the roads, regions, and facilities contained in the map image displayed on the display unit 3 and then reads text data corresponding to the names of the extracted roads, regions, and facilities from the data storage unit 2.

Next, the ECU 8 counts the number of characters in the text data (i.e., the character string). If the counted number is less than or equal to a predetermined maximum number of characters, the name is displayed in a corresponding position on the map image.

On the other hand, if the counted number is greater than the maximum number of characters, the ECU 8 interpreters the text data as scroll data to be scroll-displayed and stores the scroll data in an inner buffer (not shown). At the same time, the ECU 8 creates a scroll display field in the corresponding position on the map image. The height of the scroll display field is set equal to that of one character in the scroll data. The length of the scroll display field is set equal to a value determined by multiplying the width of one character by the maximum number of characters. Then, the name corresponding to the scroll data is displayed within the scroll display field in such a manner that the name is horizontally (e.g., from right to left) scrolled by one character.

The ECU 8 sets a starting pointer to one of characters in the scroll data. As many characters in the scroll data as the maximum number of characters from the character indicated by the starting pointer are displayed within the scroll display field. The ECU 8 moves the staring pointer by one character from the first character to the last character in the scroll data so that the name corresponding to the scroll data is scroll-displayed within the scroll display field. After being moved to the last character, the starting pointer is set to point to the first character. Thus, the name is repeatedly scrolled within the scroll display field.

The memory 10 can be used as a temporary storage area, when the ECU 8 performs the navigation operations. The memory 10, may be, for example, a memory card such as a flash memory.

Figure 2:
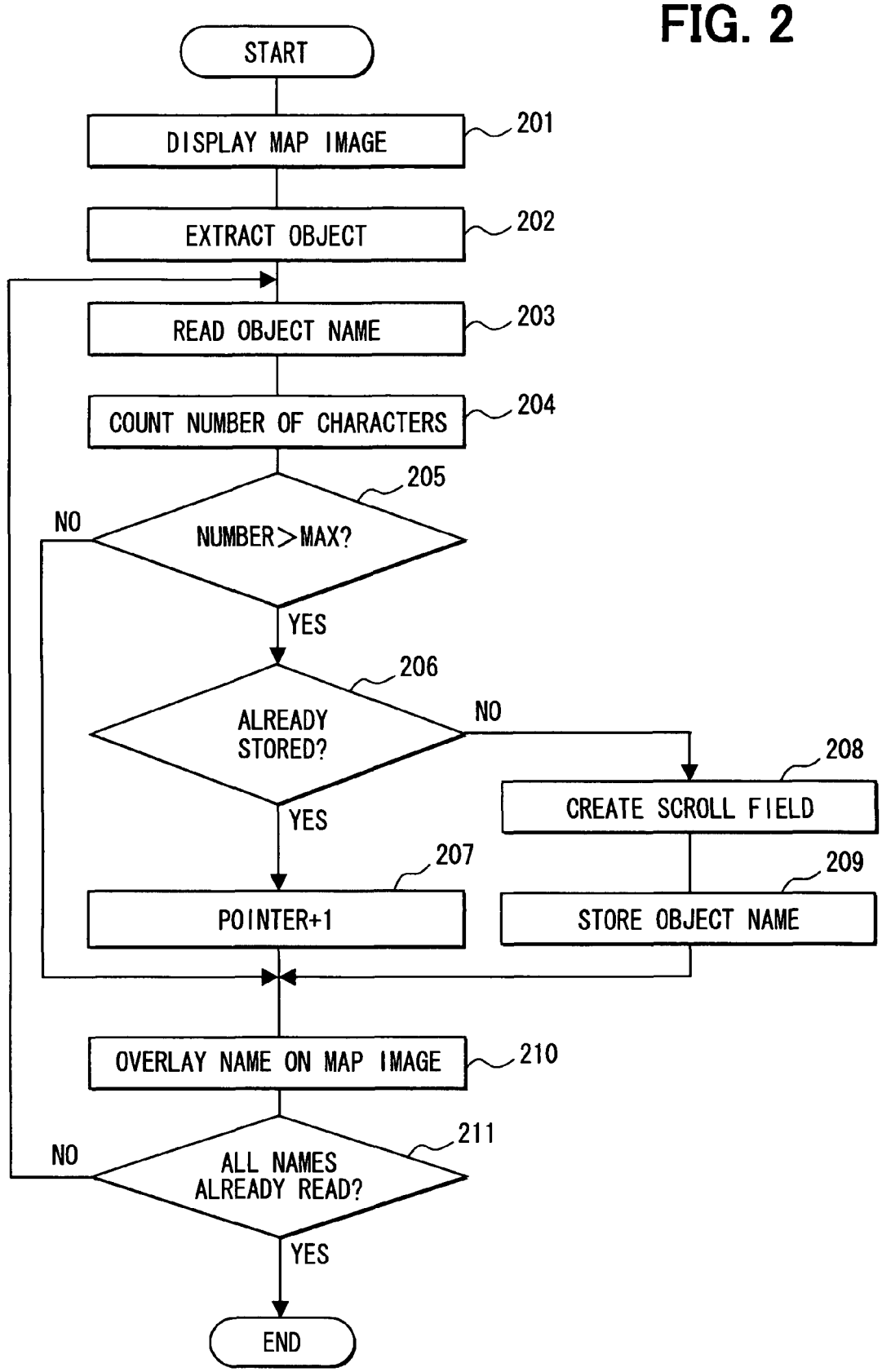
FIG. 2 is a flow diagram illustrating a process performed in the map display apparatus according to the embodiment.

The road names, region names, and facility names are overlaid on the map image in accordance with a first process illustrated by a flow diagram of FIG. 2. The first process is repeated at a predetermined time interval.

The first process starts at step 201, where the ECU 8 reads the map image data of the area around the current location of the vehicle and causes the display unit 3 to display the map image corresponding to the map image data. Then, the first process proceeds to step 202, where the ECU 8 extracts the roads, regions, facilities contained in the map image, which is displayed on the display unit 3 at step 201.

Then, the first process proceeds to step 203, where the ECU 8 selects one of the roads, regions, facilities extracted at step 202 and reads the text data corresponding to the selected one. Then, the first process proceeds to step 204, where the ECU 8 counts the number of characters in the text data, which is read at step 203.

Then, the first process proceeds to step 205, where the ECU 8 determines whether the number of characters, which is counted at step 204, is greater than a predetermined maximum number of characters. If the counted number of characters (indicated as "NUMBER" in the drawings) is greater than the maximum number of characters (indicated as "MAX" in the drawings), the ECU 8 interprets the text data as a scroll data, and the first process proceeds to step 206. On the other hand, if the counted number of characters is less than or equal to the maximum number of characters, the first process jumps to step 210.

At step 206, the ECU 8 determines whether the scroll data has been stored in the internal buffer. If the scroll data has not been stored in the internal buffer yet, the first process proceeds to step 208. On the other hand, if the scroll data has been already stored in the internal buffer, the first process proceeds to step 207.

At step 208, corresponding to NO at step 206, the ECU 8 creates a scroll display field in a position corresponding to the scroll data on the map image. For example, the scroll data represents a road name, the scroll display field is created on a position where a road associated with the road name is displayed on the map image. The height of the scroll display field is set equal to the vertical size of one character in the scroll data. The length of the scroll display field is set equal to the value determined by multiplying the horizontal size of one character in the scroll data by the maximum number of characters. Then, the first process proceeds to step 209. At step 209, the scroll data is stored in the internal buffer, and the starting pointer is set to indicate the first character in the scroll data. Then, the first process proceed to step 210.

At step 207, corresponding to YES at step 206, the starting pointer is incremented by one character to indicate the next character in the scroll data. In this case, if the starting pointer indicates the last character in the scroll data, the staring pointer returns to the first character as a result of the increment. Then, the first process proceeds to step 210.

At step 210, the name corresponding to the text data read at step 203 is displayed in the corresponding position on the map image. Specifically, when the counted number is equal to or less than the maximum number of characters, corresponding to NO at step 205, all the characters of the name are overlaid in the corresponding position on the map image at a time (i.e., without being scrolled). On the other hand, when the counted number is greater than the maximum number of characters, corresponding to YES at step 205, the name is scroll-displayed in the scroll display field created in the corresponding position on the map image. Specifically, as many characters in the scroll data as the maximum number of characters from the character indicated by the starting pointer are displayed in the scroll display field at a time.

Then, the first process proceeds to step 211, where the ECU 8 determines whether all of the text data of the roads, regions, facilities extracted at step 202 have been already read from the data storage unit 2. If all of the text data have been not read from the data storage unit 2 yet, corresponding to NO at step 211, the first process returns to step 203.

On the other hand, if all of the text data have been already read from the data storage unit 2, corresponding to YES at step 211, the first process is stopped. As mentioned previously, the first process is repeated at the predetermined time interval. Therefore, the first process restarts at step 201 after expiration of the time interval. The staring pointer is incremented each time the first process is repeated at the time interval. Thus, the name corresponding to the scroll data stored in the internal buffer is scroll-displayed within the scroll display field.

As described above, according to the present embodiment, when the number of characters in the text data to be displayed is greater than the maximum number of characters, the ECU 8 interprets the text data as the scroll data to be scroll-displayed. The name corresponding to the scroll data is scroll-displayed within the scroll display field created in the corresponding position on the map image.

The number of characters of the name displayed at a time is limited to the maximum number of characters to ensure visibility of the map image. Further, The name is scroll-displayed within the scroll display field to ensure visibility of the name. Thus, both the map image and the name overlaid on the map image can be suitably viewed.

The height of the scroll display field is set equal to the vertical size of one character in the scroll data. The length of the scroll display field is set equal to the value determined by multiplying the horizontal size of one character in the scroll data by the maximum number of characters. Alternatively, the length of the scroll display field can be adjusted within a range below the length of the name corresponding to the scroll data.

Figure 3A:
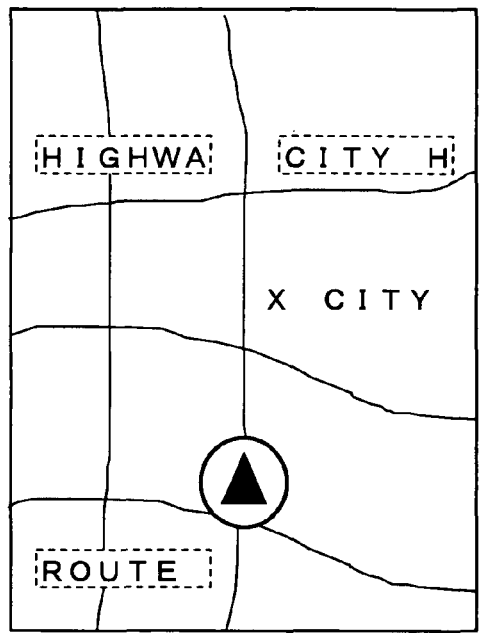
FIGS. 3A-3C are diagrams illustrating a screen of the map display apparatus according to the embodiment.
Figure 3B:
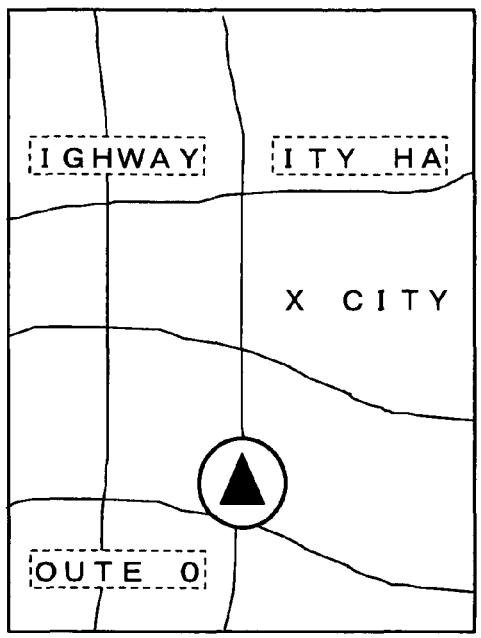
Figure 3C:
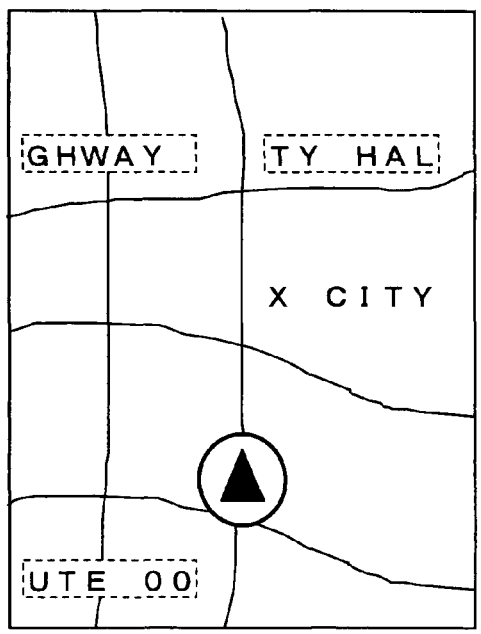

One example of the present embodiment is described below with further reference to FIGS. 3A-3C and FIG. 4. FIG. 3A shows a map image displayed on the screen of the display unit 3 at a first time. FIG. 3B shows the map image displayed on the screen of the display unit 3 at a second time after the first time by the time interval at which the first process of FIG. 2 is repeated. FIG. 3C shows the map image displayed on the screen of the display unit 3 at a third time after the second time by the time interval.

In FIGS. 3A-3C, a circle surrounding a solid triangle is the current location mark representing the current location of the vehicle. In the present example, the maximum number of characters is set to six. Therefore, the name consisting of more than six characters is scroll-displayed within the scroll display field.

The map image displayed on the screen of the display unit 3 contains a highway 999, a route 000, a city hall, and a city X. Therefore, a first road name "HIGHWAY 999", a second road name "ROUTE 000", a region name "X CITY", and a facility name "CITY HALL" are extracted at step 201 in the flow diagram of FIG. 2. As shown in FIG. 4, the number of characters of the first road name is eleven, the number of characters of the second road name is nine, the number of characters of the region name is six, the name of characters of the facility name is nine. Therefore, as can be seen from FIGS. 3A-3B, whereas the region name is overlaid on the map image without being scrolled, the first and second road names and the facility name are respectively scroll-displayed within the scroll display fields, which are represented by broken lines. In practice, the broken lines are not displayed.

(First Modification)

A first modification of the present embodiment is described below with reference to FIG. 5. A main point of the present modification is that when there are multiple scroll data to be scroll-displaced at a time, each scroll data is scroll-displayed in turn. Specifically, after a scroll of one scroll data is completed by moving the staring pointer from the first character to the last character in the one scroll data, a scroll of the other scroll data is started.

In the present modification, the ECU 8 sets an enable flag to one of the multiple scroll data, and only the scroll data with the enable flag is scroll-displayed. When a scroll of a name corresponding to one scroll data with the enable flag has been completed by moving the starting pointer from the first character to the last character in the one scroll data, the ECU 8 resets the enable flag of the one scroll data. At the same time, the ECU 8 sets the enable flag to another scroll data so that a scroll of the other scroll data is started. Thus, each scroll data is scroll-displayed in turn.

Figure 5:
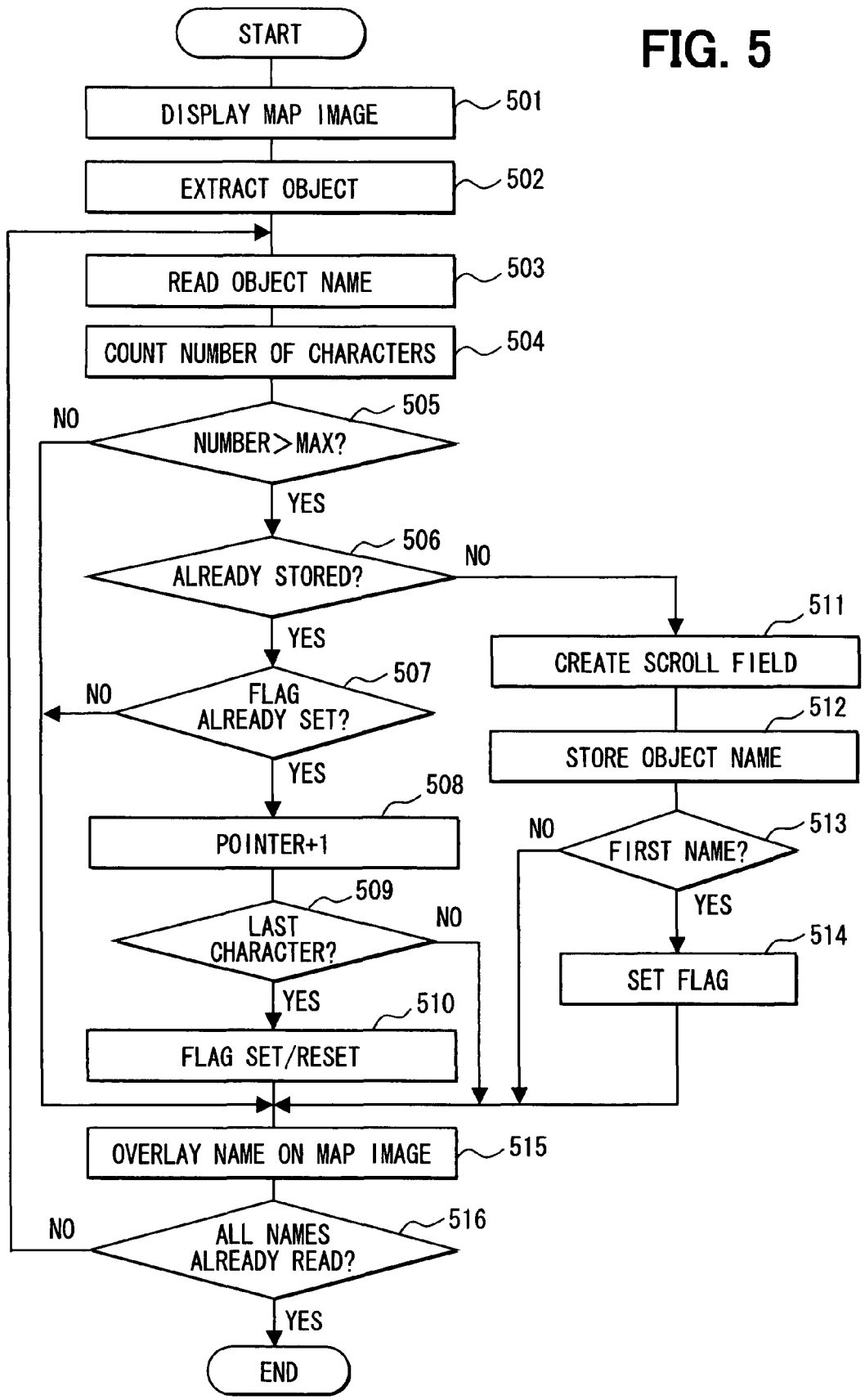
FIG. 5 is a flow diagram illustrating a process performed in a map display apparatus according to a first modification of the embodiment.

In the present modification, the road names, region names, and facility names are overlaid on the map image in accordance with a second process illustrated by a flow diagram of FIG. 5. Differences between the first second process shown in FIG. 2 and the second process shown in FIG. 5 are as follows:

The second process according to the present modification includes additional steps 507, 509, 510, 513 and 514. Steps 501-506, 508, 511, 512, 515, and 516 of FIG. 5 correspond to steps 201-211 of FIG. 2, respectively.

At step 507, the ECU 8 determines whether the scroll data stored in the internal buffer has the enable flag. If the scroll data stored in the internal buffer has the enable flag, corresponding to YES at step 507, the second process proceeds to step 508. On the other hand, if the scroll data stored in the internal buffer has no enable flag, the second process proceeds to step 515.

At step 509, the ECU 8 determines whether the starting pointer indicates the last character in the scroll data. If the starting pointer indicates the last character in the scroll data, corresponding to YES at step 509, the second process proceeds to step 510. On the other hand, if the starting pointer does not indicate the last character in the scroll data, corresponding to NO at step 509, the process proceeds to step 515.

At step 510, the ECU 8 resets the enable flag set to the present scroll data and sets the enable flag to the next scroll data stored in the internal buffer. After step 510, the process proceeds to step 515.

At step 513, the ECU 8 determines whether another scroll data than the scroll data stored at step 512 has already been stored in the internal memory. In other words, the ECU 8 determines whether the scroll data stored at step 512 is the first scroll data stored in the internal memory for the first time. If the scroll data is not the first scroll data, corresponding to NO at step 513, the process directly proceeds to step 515. On the other hand, if the scroll data is the first scroll data, corresponding to YES at step 513, the process proceeds to step 515 via step 514, where the ECU 8 sets the enable flag to the scroll data as the first scroll data.

Thus, when there are multiple scroll data to be scroll-displaced at a time, each scroll data is scroll-displayed in turn. Specifically, after the scroll of one scroll data is completed, the scroll of the other scroll data is started.

(Second Modification)

A second modification of the present embodiment is described below with reference to FIG. 6. A main point of the present modification is that whereas scroll data displayed in a scroll display field located ahead of the current location mark in the vehicle heading direction is scrolled, scroll data displayed in a scroll display field located in back of the current location mark in the vehicle heading direction is not scrolled. This is based on the fact that an user generally wants to know the names located ahead of the current location in the heading direction.

Figure 6:
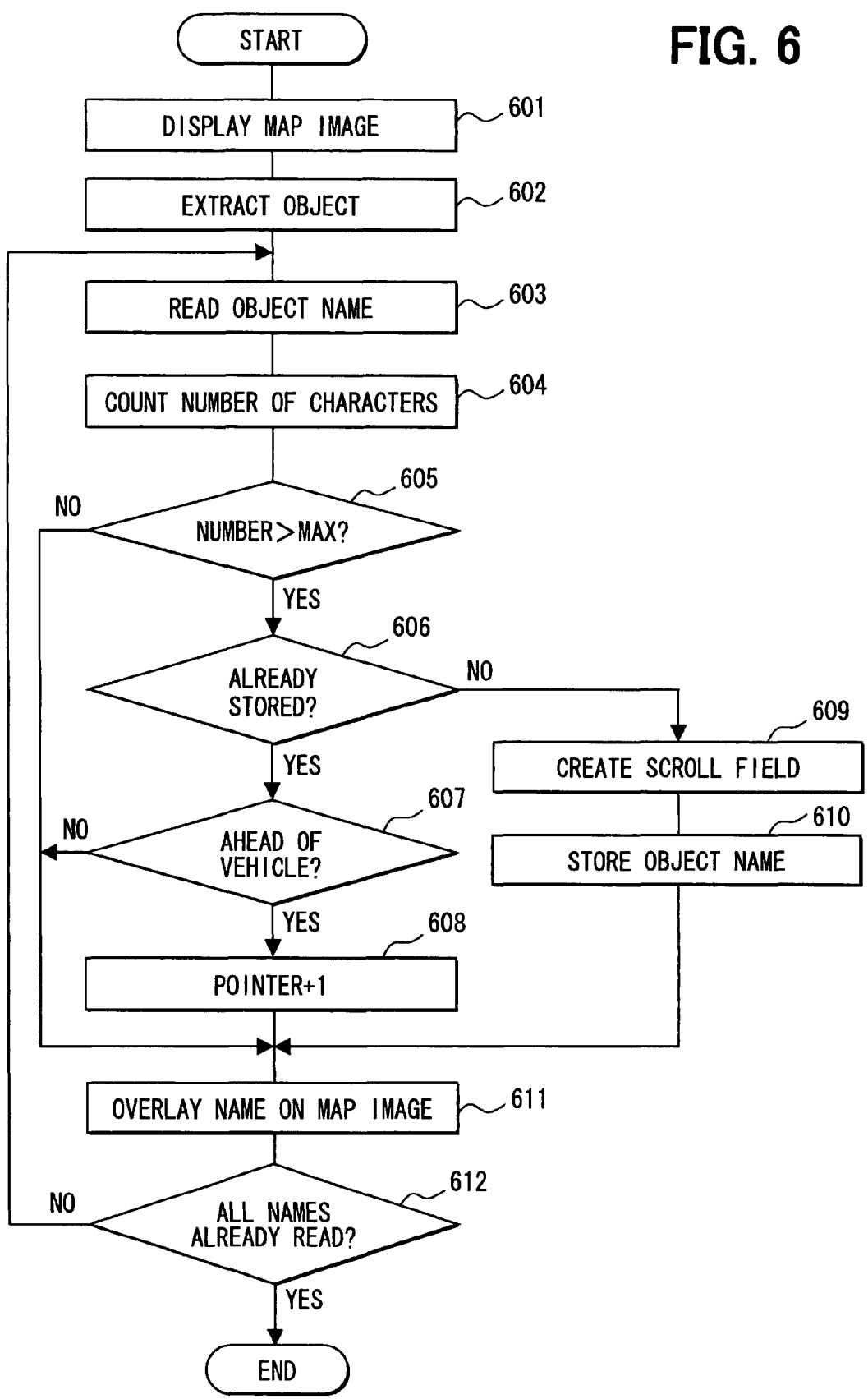
FIG. 6 is a flow diagram illustrating a process performed in a map display apparatus according to a second modification of the embodiment.

In the present modification, the road names, region names, and facility names are overlaid on the map image in accordance with a third process illustrated by a flow diagram of FIG. 6. Differences between the first second process shown in FIG. 2 and the third process shown in FIG. 6 are as follows:

The third process according to the present modification includes additional step 607. Steps 601-606, 608-612 of FIG. 6 correspond to steps 201-211 of FIG. 2, respectively.

At step 607, the ECU 8 determines whether the scroll display field is located on the upper side of the screen with respect to the current location mark representing the current location of the vehicle. As previously mentioned, the map image turns around automatically so that the heading direction always points toward the upper side of the screen. Therefore, the scroll display field located on the upper side of the screen with respect to the current location mark is located ahead of the current location mark in the vehicle heading direction.

If the scroll display field is located on the upper side of the screen with respect to the current location mark, corresponding to YES at step 607, the process proceeds to step 608. As a result, the scroll data displayed within the scroll display field located ahead of the current location mark in the vehicle heading direction is scrolled. On the other hand, if the scroll display field is located on the lower side of the screen with respect to the current location mark, corresponding to NO at step 607, the process proceeds to step 611. As a result, the scroll data displayed within the scroll display field located in back of the current location mark in the vehicle heading direction is not scrolled.

A third modification of the present embodiment is described below with reference to FIG. 7. A main point of the present modification are as follows: When a vehicle must turn right at an upcoming intersection, the ECU 8 causes the scroll data to horizontally scroll from left to right by one character (i.e., at a first scroll speed). When the vehicle must turn left at the upcoming intersection, the ECU 8 causes the scroll data to horizontally scroll from right to left by two characters (i.e., at a second scroll speed different from (greater than) the first scroll speed). When the vehicle must go straight at the upcoming intersection, the ECU 8 causes the scroll data to horizontally scroll from right to left by one character (i.e., at the first scroll speed).

According to the present modification, the ECU 8 sets a route path to a destination inputted by an user through the control switch 4 or the remote controller 5. The route path is highlighted on the map image displayed on the display unit 3 to guide the user along the route path. For example, the ECU 8 calculates the route path based on Dijkstra's algorithm.

During driving of the vehicle along the route path, when the vehicle must turn right at the upcoming intersection, the ECU 8 decrements the staring pointer by one character. When the vehicle must turn left at the upcoming intersection, the ECU 8 increments the staring pointer by two characters. When the vehicle must go straight at the upcoming intersection, the ECU 8 increments the staring pointer by one character.

Figure 7:
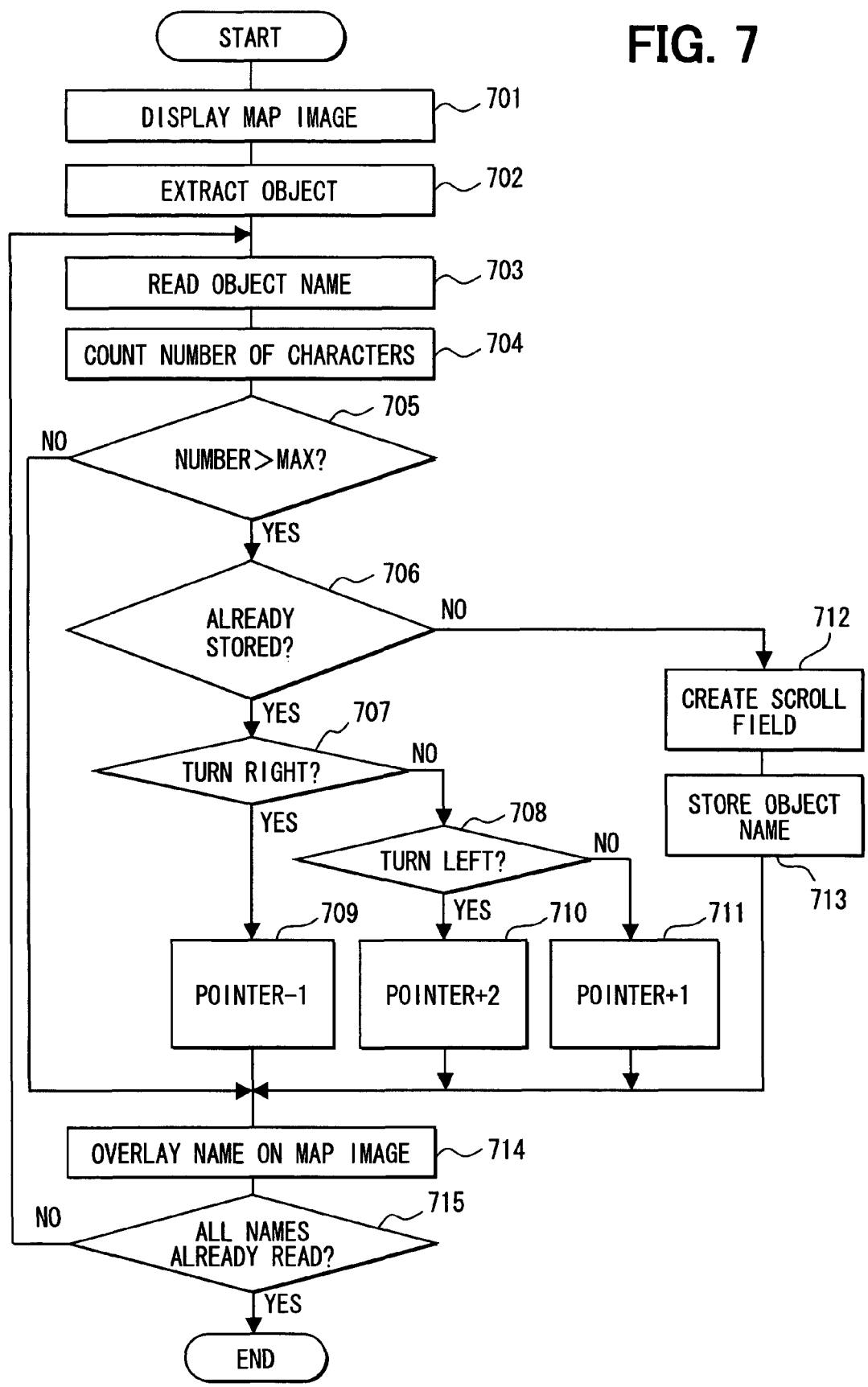
FIG. 7 is a flow diagram illustrating a process performed in a map display apparatus according to a third modification of the embodiment.

In the present modification, the road names, region names, and facility names are overlaid on the map image in accordance with a fourth process illustrated by a flow diagram of FIG. 7. Differences between the first second process shown in FIG. 2 and the fourth process shown in FIG. 7 are as follows:

The fourth process according to the present modification includes additional steps 707-710. Steps 701-706, 711-715 of FIG. 7 correspond to steps 201-211 of FIG. 2, respectively.

At step 707, the ECU 8 determines whether the vehicle must turn right at the upcoming intersection based on the current location and the route path. If the vehicle must turn right at the upcoming intersection, corresponding to YES at step 707, the fourth process proceeds to step 714 via step 709, where the staring pointer is decremented by one character. As a result, at step 714, the scroll data is horizontally scrolled from left to light by one character.

On the other hand, if the vehicle must turn left or go straight at the upcoming intersection, corresponding to NO at step 707, the fourth process proceeds to step 708. At step 708, the ECU 8 determines whether the vehicle must turn left at the upcoming intersection based on the current location and the route path. If the vehicle must turn left at the upcoming intersection, corresponding to YES at step 708, the fourth process proceeds to step 714 via step 710, where the staring pointer is incremented by two characters. As a result, at step 714, the scroll data is horizontally scrolled from right to left by two characters.

On the other hand, if the vehicle must go straight at the upcoming intersection, corresponding to NO at step 708, the fourth process proceeds to step 714 via step 711, where the staring pointer is decremented by one character. As a result, at step 714, the scroll data is horizontally scrolled from right to left by one character.

As described above, according to the present modification, when the ECU 8 determines that the vehicle must turn right at the upcoming intersection, the ECU 8 causes the scroll data to horizontally scroll from left to right by one character. When the ECU 8 determines that the vehicle must turn left at the upcoming intersection, the ECU 8 causes the scroll data to horizontally scroll from right to left by two characters. When the ECU 8 determines that the vehicle must go straight at the upcoming intersection, the ECU 8 causes the scroll data to horizontally scroll from right to left by one character. In such an approach, the user can find a direction to take at the upcoming intersection based on a scroll speed and a scroll direction of the scroll data.

(Modifications)

The embodiment described above may be modified in various ways. Although the present invention is applied to a vehicle navigation apparatus in the above described embodiment, the present invention can be applied to various apparatus that display a map. For example, the present invention may be applied to a cellular mobile phone.

Such changes and modifications are to be understood as being within the scope of the present invention as defined by the appended claims.

What is claimed is:

1. A map display apparatus comprising:
a display unit;
a data access unit accessible to map data, the map data including a map image and a plurality of character strings;
control means that allows the display unit to display the map data on a screen in such a manner that each character string is overlaid on a corresponding position on the map image;
a detection unit that detects a current location of a user and a heading direction of the user; and
a navigation unit that sets a route path of the user and guides the user along the route path,
wherein the control means interprets the character string having characters, the number of which exceeding a predetermined maximum number of characters, as a scroll character string,
wherein the control means creates a scroll display field in the corresponding position to the scroll character string and causes the scroll character string to scroll within the scroll display field,
wherein the map image displayed on the screen of the display unit indicates an area around the detected current location,
wherein the control means determines whether the scroll display field is located ahead of the current location on the screen in the heading direction, and
wherein the control means causes only the scroll character string corresponding to the scroll display field located ahead of the current location to scroll,
wherein when the navigation unit determines that the user must turn right at an upcoming intersection, the control means causes the scroll character string to scroll from left to right at a first scroll speed,
wherein when the navigation unit determines that the user must go straight at the upcoming intersection, the control means causes the scroll character string to scroll from right to left at the first scroll speed, and
wherein when the navigation unit determines that the user must turn left at the upcoming intersection, the control means causes the scroll character string to scroll from right to left at a second scroll speed different from the first scroll speed.

2. The map display apparatus according to claim 1,
wherein the plurality of character strings includes at least one of a road name, a region name, and a facility name.

3. The map display apparatus according to claim 1,
wherein size of the scroll display field is set so that the predetermined maximum number of characters is displayed at a time within the scroll display field.

4. The map display apparatus according to claim 1,
wherein the control means causes the scroll character string to scroll by one character within the scroll display field.

5. The map display apparatus according to claim 1,
wherein the control means causes the scroll character string to repeatedly scroll within the scroll display field.

6. The map display apparatus according to claim 1,
wherein the control means causes the scroll character string to horizontally scroll within the scroll display field.

7. The map display apparatus according to claim 1,
wherein when there is a plurality of scroll character strings, the control means creates a plurality of scroll display fields,
wherein the control means causes each scroll character string to scroll within a corresponding scroll display field, and
wherein after a scroll of one scroll character string is completed, a scroll of an other scroll character string is started.

8. The map display apparatus according to claim 1,
wherein the second scroll speed is greater than the first scroll speed.

9. A map display apparatus comprising:
a display unit;
a data access unit accessible to map data, the map data including a map image and a plurality of character strings;
control means that allows the display unit to display the map data on a screen in such a manner that each character string is overlaid on a corresponding position on the map image; and
a navigation unit that sets a route path of an user and guides the user along the route path,
wherein the control means interprets the character string having characters, the number of which exceeding a predetermined maximum number of characters, as a scroll character string,
wherein the control means creates a scroll display field in the corresponding position to the scroll character string and causes the scroll character string to scroll within the scroll display field,
wherein when the navigation unit determines that the user must turn right at an upcoming intersection, the control means causes the scroll character string to scroll from left to right at a first scroll speed,
wherein when the navigation unit determines that the user must go straight at the upcoming intersection, the control means causes the scroll character string to scroll from right to left at the first scroll speed, and
wherein when the navigation unit determines that the user must turn left at the upcoming intersection, the control means causes the scroll character string to scroll from right to left at a second scroll speed different from the first scroll speed.

10. The map display apparatus according to claim 9,
wherein the plurality of character strings includes at least one of a road name, a region name, and a facility name.

11. The map display apparatus according to claim 9,
wherein size of the scroll display field is set so that the predetermined maximum number of characters is displayed at a time within the scroll display field.

12. The map display apparatus according to claim 9,
wherein the control means causes the scroll character string to scroll by one character within the scroll display field.

13. The map display apparatus according to claim 9,
wherein the control means causes the scroll character string to repeatedly scroll within the scroll display field.

14. The map display apparatus according to claim 9,
wherein the control means causes the scroll character string to horizontally scroll within the scroll display field.

15. The map display apparatus according to claim 9,
wherein when there is a plurality of scroll character strings, the control means creates a plurality of scroll display fields,
wherein the control means causes each scroll character string to scroll within a corresponding scroll display field, and
wherein after a scroll of one scroll character string is completed, a scroll of an other scroll character string is started.

16. The map display apparatus according to claim 9,
wherein the second scroll speed is greater than the first scroll speed.

* * * * *